United States Patent
Benesty

(10) Patent No.: US 7,051,246 B2
(45) Date of Patent: May 23, 2006

(54) METHOD FOR ESTIMATING CLOCK SKEW WITHIN A COMMUNICATIONS NETWORK

(75) Inventor: Jacob Benesty, Summit, NJ (US)

(73) Assignee: Lucent Technologies Inc., Murray Hill, NJ (US)

(*) Notice: Subject to any disclaimer, the term of this patent is extended or adjusted under 35 U.S.C. 154(b) by 541 days.

(21) Appl. No.: 10/342,597

(22) Filed: Jan. 15, 2003

(65) Prior Publication Data

US 2004/0139375 A1     Jul. 15, 2004

(51) Int. Cl.
*G11B 5/00*     (2006.01)

(52) U.S. Cl. .......................... 714/700; 714/25; 714/44

(58) Field of Classification Search ............... 714/700, 714/48, 25, 44; 716/6; 370/516
See application file for complete search history.

(56) References Cited

U.S. PATENT DOCUMENTS

| | | | |
|---|---|---|---|
| 5,381,416 A * | 1/1995 | Vartti et al. | 714/700 |
| 6,327,274 B1 * | 12/2001 | Ravikanth | 370/516 |
| 6,470,483 B1 * | 10/2002 | Rodriguez et al. | 716/6 |
| 6,661,810 B1 * | 12/2003 | Skelly et al. | 370/516 |

OTHER PUBLICATIONS

O. Hodson, C. Perkins, and V. Hardman, "Skew detection and compensation for Internet audio applications," in *Proc. IEEE ICME*, 2000, vol. 3, pp. 1687-1690.

S.B. Moon, P. Skelly, and D. Towsley, "Estimation and removal of clock skew from network delay measurements," in *Proc. IEEE INFOCOM*, 1999, vol. 1, pp. 227-234.

T. Trump, "Estimation of clock skew in telephony over packet switched networks," in *Proc. IEEE ICASSP*, 2000, vol. 5, pp. 2605-2609.

P. Deleon and C.J. Sreenan, "An adaptive predictor for media playout buffering," in *Proc. IEEE, ICASSP*, 1999, vol. A6, pp. 3097-3100.

H. Schulzrinne and J. Rosenberg, "The IETF internet telephony architecture and protocols," *IEEE Network*, vol. 13, pp. 18-23, May/Jun. 1999.

* cited by examiner

*Primary Examiner*—Albert Decady
*Assistant Examiner*—Fritz Alphonse
(74) *Attorney, Agent, or Firm*—Kenneth M. Brown

(57) ABSTRACT

A method for calculating an estimate of the clock skew between a sender's clock and a receiver's clock in a packet-based communications network. An adaptive algorithm is employed in which a recursive least squares approach is used to calculate an estimate of the clock skew based on the transmission of a given (i e., the "current") packet, which estimate is further based on a previous estimate thereof ("a first approximation" thereof). This illustrative process then iterates with each new packet, producing increasingly accurate estimates of the clock skew.

18 Claims, 3 Drawing Sheets

METHOD FOR ESTIMATING CLOCK SKEW WITHIN A COMMUNICATIONS NETWORK

FIELD OF THE INVENTION

The present invention relates generally to the field of packet-based communication systems, and more particularly to the measurement of clock skew between clocks within such a communications system.

BACKGROUND OF THE INVENTION

Clock skew is caused by the difference in clock frequency between two clocks positioned at different locations in a communications system. The problem of clock skew almost always appears when there is communication between two systems or portions of a network, each of which has its own clock. Because of variations in the quartz crystal and other oscillator components that regulate the clock frequency, some variation is usually observable between nominally similar clocks. In the context of network delay measurement, the clock skew will introduce an artificial delay. Thus, it is important to remove its effect in order to obtain an accurate estimate of the end-to-end transmission delay, which is often used to analyze the network's performance.

In Internet audio and video applications, the difference in clock frequencies also has other undesirable effects. For example, if the sender's clock frequency is higher than the receiver's clock frequency, the receiver will systematically receive more audio samples than it is able to replay according to its own clock, which leads to systematic overfill of its buffer. Conversely, if the sender's clock frequency is lower than the receiver's, the receiver will systematically find itself lacking audio samples to replay.

Thus it would be highly desirable to provide an efficient method for performing an accurate estimation of clock skew between a sender's clock and a receiver's clock in a packet-based communications network. One particular advantageous use of such a method, for example, may be to adjust buffer sizes associated with sending and/or receiving locations in a network in accordance with such an estimated clock skew.

SUMMARY OF THE INVENTION

The present invention provides, in accordance with certain illustrative embodiments thereof, an efficient and accurate method for calculating an estimate of the clock skew between a sender's clock and a receiver's clock in a packet-based communications network. In particular, an adaptive algorithm is illustratively employed in which a recursive least squares approach is used to calculate an estimate of the clock skew based on the transmission of a given (i.e., the "current") packet, which estimate is further based on a previous estimate of the clock skew ("a first approximation" thereof). This illustrative process then iterates adaptively with each successive packet, producing increasingly accurate estimates of the clock skew.

More particularly, the present invention provides a method of calculating an estimate of a clock skew between a sender clock and a receiver clock in a packet-based communications network, the sender clock being associated with a sending location in the communications network from which one or more packets have been transmitted to a receiving location in the communications network, and the receiver clock being associated with the receiving location in the communications network. The inventive method comprises the steps of calculating a first approximation of the clock skew between the sender clock and the receiver clock based on the transmission of one or more of said packets; evaluating the transmission of a current packet (the current packet having been transmitted subsequent to the transmission of the one or more packets) to measure a predetermined characteristic of the transmission of the current packet; and calculating the estimate of the clock skew between the sender clock and the receiver clock based on the first approximation thereof and on the measured characteristic of the transmission of the current packet.

In accordance with one illustrative embodiment of the present invention, the delay jitter (i.e., variable delay) associated with the current packet is also estimated recursively. Then, this estimated delay jitter is advantageously used to more accurately estimate the clock skew between the sender clock and the receiver clock. In accordance with another illustrative embodiment of the present invention, the estimated clock skew is advantageously used to adjust the size of the input buffer associated with the receiving location in the communications network.

DETAILED DESCRIPTION

Introduction

Figure 1:
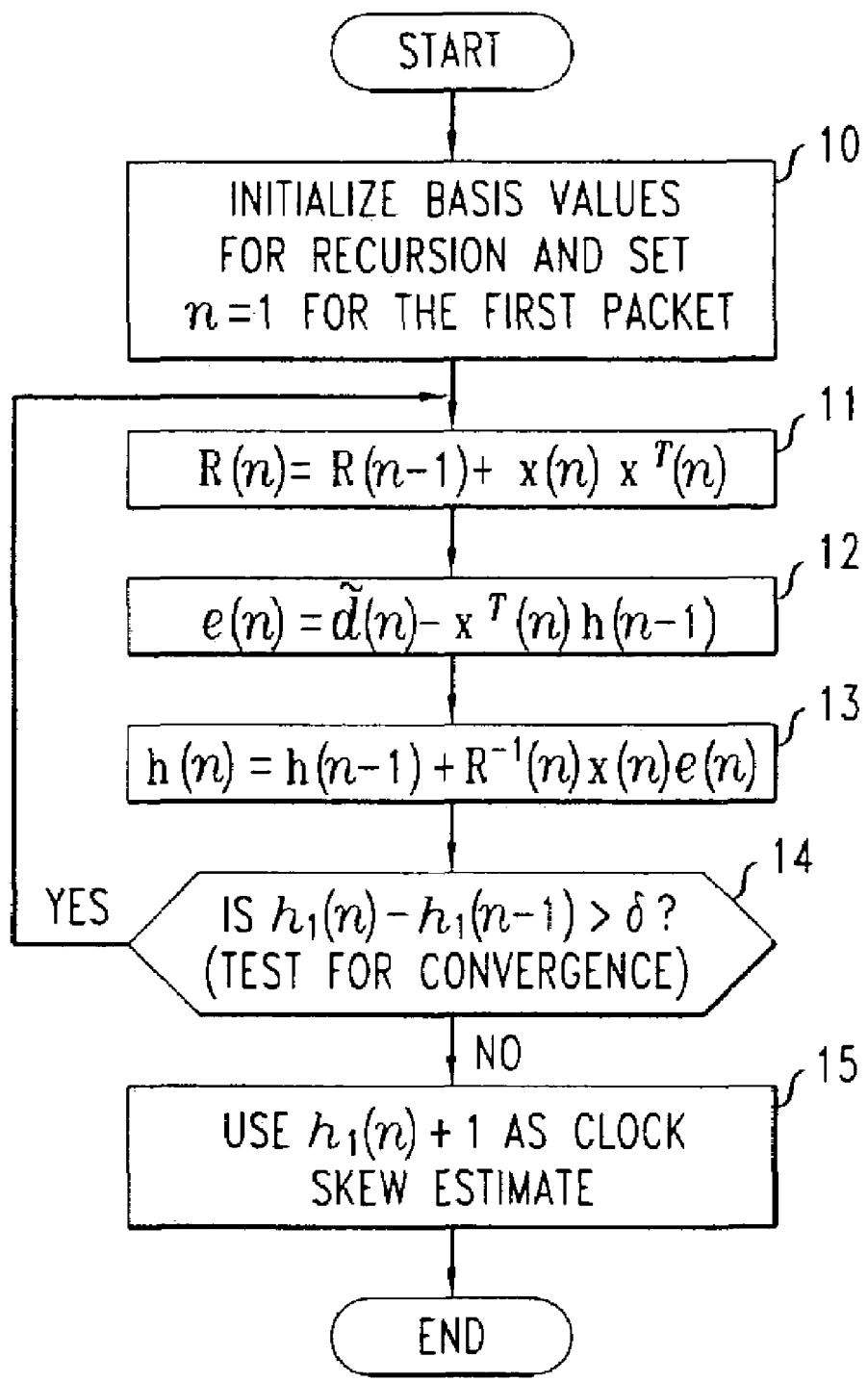
FIG. 1 shows a flowchart of an illustrative method for calculating an estimate of a clock skew between a sending clock and a receiving clock in accordance with a first illustrative embodiment of the present invention.

In addition to the artificial delay introduced by clock skew (i.e., the difference in the frequencies between the sender clock and the receiver clock), the total end-to-end transmission delay is composed of transmission and propagation delays plus variable queuing delay. This variable queuing delay, known as delay jitter, means that the time difference between transmitting any two packets at the sender is unlikely to be the same as that observed between their arrivals at the receiver. As such, it is advantageous to model this delay jitter as a random process.

The well-known real-time protocol (RTP) for network communication, fully familiar to those of ordinary skill in the art, supports the transport of real time media content (e.g., audio and video) over packet-based networks. An RTP header contains information such as the sequence number and timestamp of a packet. This information may be advantageously used by the receiver to reconstruct the source and to determine the end-to-end transmission delay. For illustrative purposes herein, it will be assumed that such a protocol is used.

Terminology and Problem Formulation

Suppose that there is a connection between two hosts—a sender which transmits a sequence of packets through the communications network, and a receiver to whom the packets are being sent. Each host has its own clock, referred to herein as the sender clock and the receiver clock, respectively. The sender adds a timestamp (corresponding to its own clock) to a packet when it leaves, and the receiver records the time the packet arrives according to its own clock.

The following terminology will be used herein:

$c_s$ will be used to refer to the sender clock.

$c_r$ will be used to refer to the receiver clock.

N is the number of packets sent by the sender that have arrived at the receiver.

$t_s^s(n)$ is the timestamp of the n'th packet leaving the sender according to $c_s$.

$t_s^r(n)$ is the timestamp of the n'th packet leaving the sender according to $c_r$.

$t_r^r(n)$ is the timestamp of the n'th packet arriving at the receiver according to $c_r$.

$t_r^s(n)$ is the timestamp of the n'th packet arriving at the receiver according to $c_s$.

Note that $t_r^r(n)$ and $t_s^s(n)$ are known, but that $t_r^s(n)$ and $t_s^r(n)$ are not.

The timestamp of the n'th packet arriving at the receiver according to $c_s$ can be written explicitly as:

$$t_r^s(n) = t_s^s(n) + d_f^s + v^s(n), \quad (1)$$

where $d_f^s$ is the (fixed) transmission and propagation delay. (That is, for all of the packets transmitted during a connection, this delay is assumed to be the same.) The random variable $v^s(n)$ characterizes the extra delay, referred to as delay jitter, which is added by the network (e.g., due to queuing) for (each particular) packet n.

It will also be assumed herein that there is no initial offset (i.e., difference in time) between the clocks and only the clock frequencies are different. Clearly, one-way measurements alone do not give enough information to distinguish a clock offset from the fixed delay. If the two clocks progress at different frequencies (that is, if they have a clock skew, $\alpha \neq 1$), then $t_s^r(n) \neq t_s^s(n)$ and $t_r^r(n) \neq t_r^s(n)$.

The timestamp of the n'th packet arriving at the receiver according to $c_r$ is:

$$\begin{aligned} t_r^r(n) &= \alpha t_r^s(n) \quad (2) \\ &= \alpha t_s^s(n) + \alpha d_f^s + \alpha v^s(n) \\ &= \alpha t_s^s(n) + d_f^r + v^r(n), \end{aligned}$$

where $\alpha$ is the clock ratio, which is constant if $c_s$ and $c_r$ have constant frequencies.

The parameter $\alpha$ can be smaller or greater than one but is in general very close to one. In accordance with one illustrative embodiment of the present invention, the task is to estimate $\alpha$, $d_f^r$ and $v^r(n)$, given $t_r^r(n)$ and $t_s^s(n)$ over N packets, n=1, 2, . . . , N.

The end-to-end transmission delay of the n'th packet consistent with $c_r$ is:

$$\begin{aligned} d^r(n) &= t_r^r(n) - t_s^r(n) \quad (3) \\ &= t_r^r(n) - \alpha t_s^s(n) \\ &= d_f^r + v^r(n). \end{aligned}$$

However, this delay is not known at the receiver and only the end-to-end delay measurement of the n'th packet can be determined as follows:

$$\begin{aligned} \tilde{d}(n) &= t_r^r(n) - t_s^s(n) \quad (4) \\ &= (\alpha - 1)t_s^s(n) + d_f^r + v^r(n) \\ &= (\alpha - 1)t_s^s(n) + d^r(n), \end{aligned}$$

which is consistent with neither $c_r$ nor $c_s$. Note that in Equation (4), $\tilde{d}(n)$ is different from $d^r(n)$ by $(\alpha-1)t_s^s(n)$. If $\alpha > 1$, then $(\alpha-1)t_s^s(n)$ grows linearly with $t_s^s(n)$, and thus, $\tilde{d}(n)$ gets larger.

Now let $\hat{\alpha}$ be an estimate of $\alpha$. From the end-to-end delay measurement, an estimate of the end-to-end delay $d^r(n)$ may be easily obtained as follows:

$$\hat{d}^r(n) = \tilde{d}(n) - (\hat{\alpha}-1)t_s^s(n). \quad (5)$$

It is clear from the discussion above that it is natural and convenient to estimate all of the variables in accordance with the receiver clock, $c_r$.

As used herein, the delay jitter, $v^r(n)$, is advantageously modeled as an independent, identically distributed ("i.i.d.") random process with exponential probability density function ("pdf") as follows:

$$f(v^r) = u(v^r)\lambda \exp(-\lambda v^r), \quad (6)$$

where $u(v^r)$ is the unit step function:

$$u(x) = \begin{cases} x & \text{if } x \geq 0 \\ 0 & \text{if } x < 0. \end{cases}$$

The mean and variance of the exponential distribution are $E\{v^r\}=1/\lambda$ and $E\{(v^r-E\{v^r\})^2\}=1/\lambda^2$, respectively, where $E\{\cdot\}$ denotes mathematical expectation. (The exponential distribution is often used to model queuing times in a service queue and it has been shown that the variable part of the delay caused by all individual router is reasonably well modeled with this pdf.)

A First Illustrative Method for Calculating an Estimate of the Clock Skew

The least squares ("LS") estimator is a well-known technique which is widely used, primarily because it is easy to implement. It is derived from the minimization of a least squares error criterion. Specifically, we will define the error signal for packet n as follows:

$$e(n) = \tilde{d}(n) - \hat{d}(n), \quad (7)$$

where $$\hat{d}(n) = (\hat{\alpha}-1)t_s^s(n) + \hat{d}_f^r \quad (8)$$

is an estimate of $\tilde{d}(n)$ and $\hat{d}_f^r$ is an estimate of $d_f^r$. Here, the delay jitter is advantageously considered to be noise. Equation (7) can be rewritten in a more compact form as follows:

$$e(n) = \tilde{d}(n) - x^T(n)h, \quad (9)$$

where

-continued $$x(n) = [x_1(n) \quad 1]^T$$
$$= [t_s^s(n) \quad 1]^T,$$
$$h = [h_1 \quad h_2]^T$$
$$= [\hat{\alpha} - 1 \quad \hat{d}_f^r]^T,$$

and where superscript $^T$ denotes the transpose of a vector or a matrix.

Now consider the following cost function:

$$J(h) = \sum_{n=1}^{N} e^2(n). \tag{10}$$

The minimization of Equation (10) with respect to h gives the LS estimator as follows:

$$h(N) = R^{-1}(N)r(N), \tag{11}$$

which is commonly referred to as the "normal equation", where $$R(N) = \sum_{n=1}^{N} x(n)x^T(n), \tag{12}$$

and $$r(N) = \sum_{n=1}^{N} x(n)\tilde{d}(n). \tag{13}$$

If the sender begins to send packets at time 00:00 and sends them at a constant packetization time p, every p seconds (which means that $t_s^s(n) - t_s^s(n-1) = p$ where p is a constant), we have the following:

$$t_s^s(n) = np, \, n = 1, 2, \ldots, N.$$

In this case, Equation (12) then has the following form:

$$R(N) = \begin{bmatrix} \frac{p^2 N(N+1)(2N+1)}{6} & \frac{pN(N+1)}{2} \\ \frac{pN(N+1)}{2} & N \end{bmatrix}. \tag{14}$$

Using Equations (11), (13), (4), and (14), it can easily be seen that:

$$E\{h(N)\} = \begin{bmatrix} \alpha - 1 \\ d_f^r \end{bmatrix} + \begin{bmatrix} 0 \\ 1/\lambda \end{bmatrix}, \tag{15}$$

which means that the LS estimator is unbiased for α but biased for $d_f^r$ with a bias equal to the mean of the delay jitter. If one is only interested in finding an estimate of the end-to-end transmission delay, $d^r(n)$, the fact that $\hat{d}_f^r$ is biased will have no influence on the result according to Equation (5).

In practice, however, it would be highly advantageous to compute the normal equation recursively. Thus, in accordance with a first illustrative embodiment of the present invention, a recursive least squares (RLS) algorithm is used to calculate an estimate of a clock skew between a sender clock and a receiver clock in a packet-based communications network as follows:

$$R(n) = R(n-1) + x(n)x^T(n), \tag{16}$$

$$e(n) = \tilde{d}(n) - x^T(n)h(n-1), \tag{17}$$

$$h(n) = h(n-1) + R^{-1}(n)x(n)e(n). \tag{18}$$

(Note that in accordance with one illustrative embodiment of the present invention, $R^{-1}(n)$ may also be recursively updated, but the advantage of doing so is marginal since R is a simple 2×2 matrix.)

FIG. 1 shows a flowchart of an illustrative method for calculating an estimate of a clock skew between a sending clock and a receiving clock in accordance with the first illustrative embodiment of the present invention as described in Equations (16), (17) and (18). Block 10 performs the initialization for the recursion and blocks 11, 12 and 13 implement the calculations of Equations (16), (17) and (18), respectively. Then, decision block 14 determines whether the adaptive estimation process has resulted in the convergence of the clock skew estimate, and if so, the resultant estimate may be reliably used (block 15).

Note that when the noise signal is assumed to be zero-mean, white, and Gaussian, the least squares estimator used above is equivalent to the maximum likelihood ("ML") estimator, well known to those skilled in the art, and hence it is asymptotically efficient. As such, it may be advantageous to use the ML estimator since the noise (i.e., the delay jitter) may be modeled best with an exponential distribution as discussed above. The ML estimator advantageously has the asymptotic properties of being unbiased and achieving the Cramer-Rao lower bound (familiar to those skilled in the art).

In this regard, first define the following error vector:

$$e = [e(1)e(2) \ldots e(N)]^T.$$

Because of the i.i.d. assumption with respect to the delay jitter (see the discussion above), the joint probability (parameterized by h) of the whole vector e is the product of the marginal densities:

$$f(e) = \prod_{n=1}^{N} u[e(n)]\lambda \exp[-\lambda e(n)] \tag{19}$$

$$= \lambda^N \exp\left[-\lambda \sum_{n=1}^{N} e(n)\right] \prod_{n=1}^{N} u[e(n)].$$

The ML estimator is obtained by maximizing $f(e)$, which is equivalent to the following linear programming problem:

$$\max\left[-\sum_{n=1}^{N} e(n)\right] = \min\left[\sum_{n=1}^{N} e(n)\right] \tag{20}$$

$$= \min\left[-\sum_{n=1}^{N} x^T(n)h\right]$$

-continued subject to $x^T(n)h \leq \tilde{d}(n), n = 1, 2, \ldots, N$.

Note that the N constraints in Equation (20) come from the likelihood function in Equation (19), which for $f(e) \neq 0$ requires $e(n) \geq 0$, $\forall n \geq 1$. Thus, because of the exponential distribution, it turns out that using the ML estimator results in a classical linear programming problem.

A Second Illustrative Method for Calculating an Estimate of the Clock Skew

Note that the accuracy of the estimation of the clock skew in accordance with the first illustrative embodiment of the present invention described above depends upon the delay jitter generally being small with respect to the total end-to-end transmission delay. That is, if the delay jitter is consistently large with respect to the end-to-end delay, the accuracy of the algorithm described above may be reduced. In accordance with a second illustrative embodiment of the present invention, however, the delay jitter is also recursively estimated, thereby providing a more accurate estimate of the clock skew even in the presence of consistently large delay jitter.

Specifically, the following derivation shows how, in accordance with the second illustrative embodiment of the present invention, we can recursively estimate the delay jitter of the n'th packet from the previous one. Recall that the end-to-end delay measurements of packets n and n−1, respectively, are as follows:

$$\tilde{d}(n) = (\alpha-1)t_s^s(n) + d_f^r + v^r(n), \quad (21)$$

$$\tilde{d}(n-1) = (\alpha-1)t_s^s(n-1) + d_f^r + v^r(n-1). \quad (22)$$

Taking the difference of the Equations (21) and (22), gives the following:

$$v^r(n) = v^r(n-1) + \tilde{d}(n) - \tilde{d}(n-1) - (\alpha-1)[t_s^s(n) - t_s^s(n-1)], \quad (23)$$

and if the sender transmits packets at a constant packetization time p, then Equation (23) can be simplified to the following:

$$v^r(n) = v^r(n-1) + \tilde{d}(n) - \tilde{d}(n-1) - p(\alpha-1). \quad (24)$$

Note that Equation (24) depends on the clock skew but is independent of the fixed delay. Note also that one advantage of using a recursive algorithm in accordance with the principles of the present invention is that even when the parameter α is not known, it can be advantageously replaced by its estimate. Hence, in accordance with the second illustrative embodiment of the present invention, the following recursion may be advantageously used to estimate the delay jitter for the n'th packet:

$$\hat{v}^r(n) = |\hat{v}^r(n-1) + \tilde{d}(n) - \tilde{d}(n-1) - ph_1(n-1)|, \quad (25)$$

where $h_1(n-1) = \hat{\alpha}(n-1) - 1$ is advantageously computed with the RLS algorithm in accordance with the principles of the present invention. Note that the use of the absolute value function in Equation (25) advantageously avoids negative delays.

Thus, in accordance with the second illustrative embodiment of the present invention, calculating an estimate for the delay jitter advantageously provides for an improvement to the RLS algorithm described above in Equations (16), (17) and (18) in accordance with the first illustrative embodiment of the present invention. Indeed, by subtracting $\hat{v}^r(n)$ from the error signal in Equation (17), the RLS algorithm of the first illustrative embodiment is, essentially, made unbiased.

A complete unbiased RLS algorithm for use in calculating an estimate of a clock skew between a sender clock and a receiver clock in a packet-based communications network in accordance with the second illustrative embodiment of the present invention is, therefore, as follows:

$$\hat{v}^r(n) = |\hat{v}^r(n-1) + \tilde{d}(n) - \tilde{d}(n-1) - [x_1(n) - x_1(n-1)]h_1(n-1)|, \quad (26)$$

$$R(n) = R(n-1) + x(n)x^T(n), \quad (27)$$

$$e_0(n) = \tilde{d}(n) - x^T(n)h(n-1) - \hat{v}^r(n), \quad (28)$$

$$h(n) = h(n-1) + R^{-1}(n)x(n)e_0(n). \quad (29)$$

Figure 2:
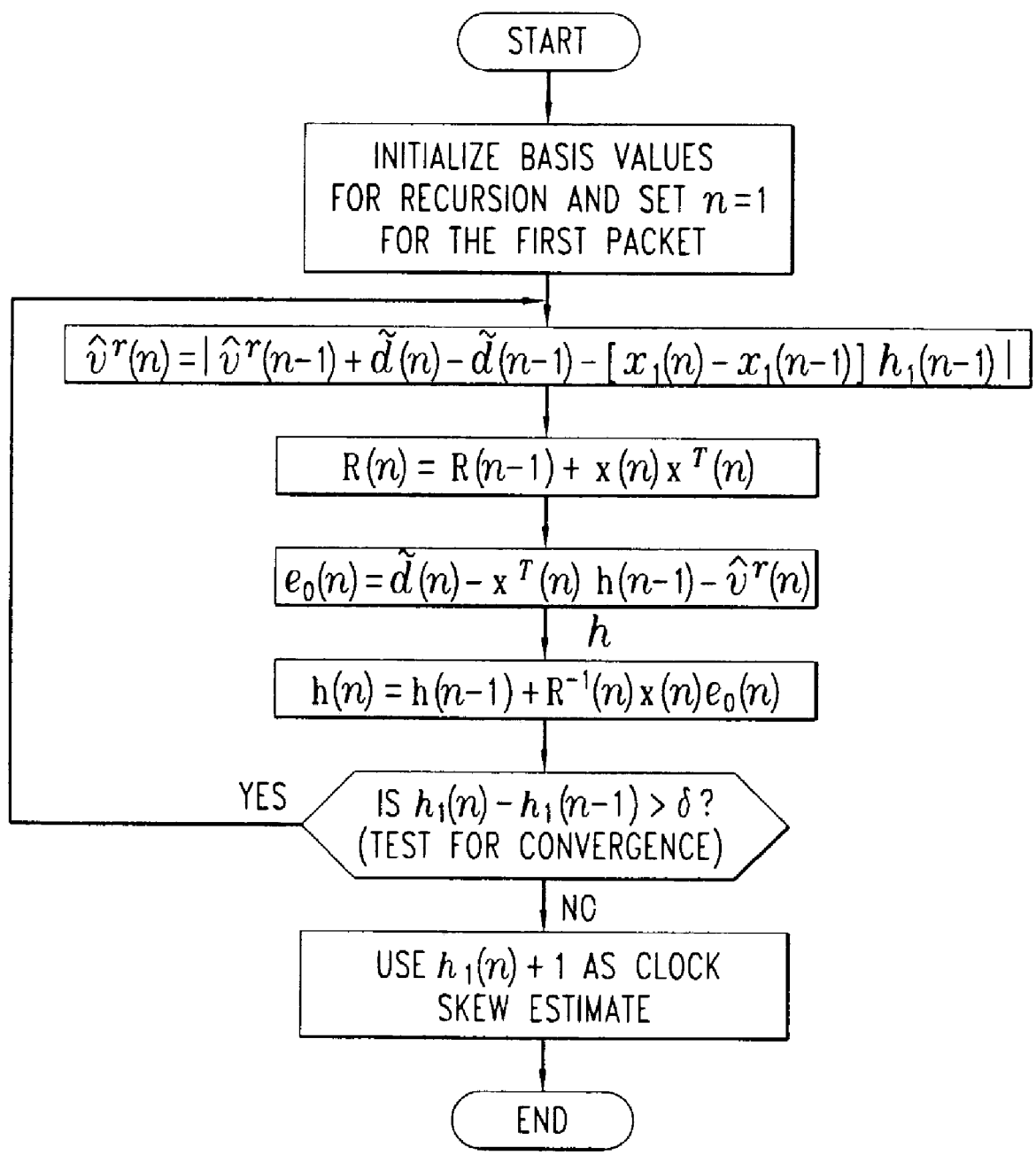
FIG. 2 shows a flowchart of an illustrative method for calculating an estimate of a clock skew between a sending clock and a receiving clock in accordance with a second illustrative embodiment of the present invention.

FIG. 2 shows a flowchart of an illustrative method for calculating an estimate of a clock skew between a sending clock and a receiving clock in accordance with the second illustrative embodiment of the present invention as described in Equations (26), (27), (28) and (29). Block 20 performs the initialization I-or the recursion and blocks 21, 22, 23 and 24 implement the calculations of Equations (26), (27), (28) and (29), respectively. Then, decision block 25 determines whether the adaptive estimation process has resulted in the convergence of the clock skew estimate, and if so, the resultant estimate may be reliably used (block 26).

An Illustrative Embodiment for Adjusting Input Buffer Sizes Based on Clock Skew

Figure 3:
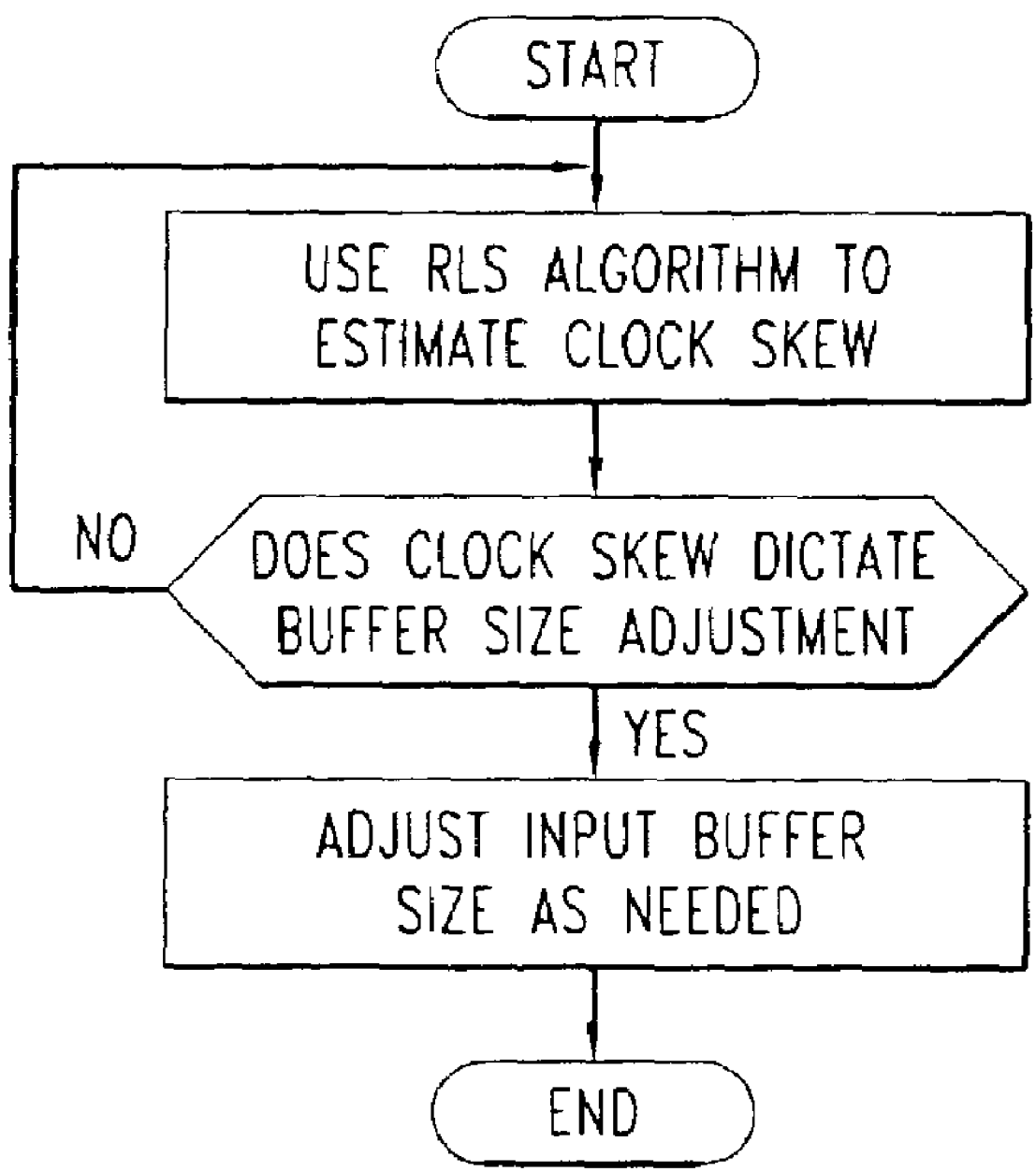
FIG. 3 shows a flowchart of an illustrative method for adjusting an input buffer size based on a calculated estimate of a clock skew between a sending clock and a receiving clock in accordance with another illustrative embodiment of the present invention.

FIG. 3 shows a flowchart of an illustrative method for adjusting an input buffer size based on a calculated estimate of a clock skew between a sending clock and a receiving clock in accordance with one illustrative embodiment of the present invention. As shown in block 31, the RLS algorithm of either the first or the second illustrative embodiments of the present invention (as illustratively shown in FIGS. 1 and 2, respectively) are performed to estimate the clock skew between a sending clock and a receiving clock in a packet-based communications network. Then, decision block 32 determines whether the clock skew requires that an adjustment be made to the size of the input buffer at the receiving location. If so, block 33 makes the necessary adjustment.

Addendum to the Detailed Description

It should be noted that all of the preceding discussion merely illustrates the general principles of the invention. It will be appreciated that those skilled in the art will be able to devise various other arrangements, which, although not explicitly described or shown herein, embody the principles of the invention, and are included within its spirit and scope.

Furthermore, all examples and conditional language recited herein are principally intended expressly to be only for pedagogical purposes to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. It is also intended that such equivalents include both currently known equivalents as well as equivalents developed in the future—i.e., any elements developed that perform the same function, regardless of structure.

Thus, for example, it will be appreciated by those skilled in the art that the block diagrams herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable medium and so executed by a computer or processor, whether or not such computer or processor is explicitly shown. Thus, the blocks shown, for example, in such flowcharts may be understood as potentially representing physical elements, which may, for example, be expressed in the instant claims as means for specifying particular functions such as are described in the flowchart blocks. Moreover, such flowchart blocks may also be understood as representing physical signals or stored physical data, which may, for example, be comprised in such aforementioned computer readable medium such as disc or semiconductor storage devices.

The functions of the various elements shown in the figures, including functional blocks labeled as "processors" or "modules" may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitations digital signal processor (DSP) hardware, read-only memory (ROM) for storing software, random access memory (RAM), and non-volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

I claim:

1. A method of calculating an estimate of a clock skew between a sender clock and a receiver clock in a packet-based communications network, the sender clock associated with a sending location in the communications network from which one or more packets have been transmitted to a receiving location in the communications network, the receiver clock associated with the receiving location in the communications network, the method comprising the steps of:
   calculating a first approximation of the clock skew between the sender clock and the receiver clock based on the transmission of one or more of said packets;
   evaluating the transmission of a current packet, said current packet having been transmitted subsequent to said transmission of said one or more of said packets, to measure a predetermined characteristic of said transmission of said current packet;
   computing a covariance matrix associated with said current packet based on a timestamp of the sender clock representative of said current packet being sent and on a previous covariance matrix associated with a packet transmitted prior to said transmission of said current packet; and
   calculating said estimate of the clock skew between the sender clock and the receiver clock based on said first approximation thereof and on said measured characteristic of said transmission of said current packet.

2. The method of claim 1 wherein said predetermined characteristic of said transmission of said current packet comprises an end-to-end transmission delay.

3. The method of claim 2 wherein said end-to-end transmission delay is calculated to be a difference between a timestamp of the sender clock representative of said current packet being sent and a timestamp of the receiver clock representative of said current packet being received.

4. The method of claim 2 wherein said estimate of the clock skew between the sender clock and the receiver clock is calculated based at least on an error signal comprising a difference between said measured characteristic comprising said end-to-end transmission delay and an estimate of said end-to-end transmission delay.

5. The method of claim 4 wherein said estimate of said end-to-end transmission delay is calculated based on said first approximation of the clock skew between the sender clock and the receiver clock.

6. The method of claim 1 wherein said estimate of the clock skew between the sender clock and the receiver clock is calculated based on said covariance matrix associated with said current packet.

7. The method of claim 6 wherein said estimate of the clock skew between the sender clock and the receiver clock is calculated based on a summation of said first approximation of the clock skew between the sender clock and the receiver clock and of a product of:
   (i) an inverse of said covariance matrix,
   (ii) an error signal comprising a difference between said measured characteristic comprising said end-to-end transmission delay and an estimate of said end-to-end transmission delay, wherein said estimate of said end-to-end transmission delay is calculated based on said first approximation of the clock skew between the sender clock and the receiver clock, and
   (iii) a vector comprising said timestamp of the sender clock representative of said current packet being sent.

8. The method of claim 1 further comprising the step of calculating an estimate of a delay jitter associated with said transmission of said current packet.

9. The method of claim 8 wherein said estimate of the clock skew between the sender clock and the receiver clock is calculated based at least on an error signal comprising a difference between said measured characteristic comprising said end-to-end transmission delay and an estimate of said end-to-end transmission delay, said error signal being further calculated based on said estimate of said delay jitter associated with said transmission of said current packet.

10. The method of claim 9 wherein said estimate of said end-to-end transmission delay is calculated based on said first approximation of the clock skew between the sender clock and the receiver clock.

11. The method of claim 8 wherein said estimate of the clock skew between the sender clock and the receiver clock is calculated based on said covariance matrix associated with said current packet.

12. The method of claim 9 wherein the estimate of the delay jitter is calculated based on:
   (i) a previous estimate of the delay jitter,
   (ii) an end-to-end transmission delay of said current packet,
   (iii) an end-to-end transmission delay of a packet transmitted previous to the transmission of said current packet, and
   (iv) said first approximation of the clock skew between the sender clock and the receiver clock.

13. The method of claim 11 wherein said estimate of the clock skew between the sender clock and the receiver clock is calculated based on a summation of said first approximation of the clock skew between the sender clock and the receiver clock and of a product of:
   (i) an inverse of said covariance matrix,
   (ii) an error signal comprising a difference between said measured characteristic comprising said end-to-end transmission delay and an estimate of said end-to-end transmission delay, said error signal being further calculated based on said estimate of said delay jitter associated with said transmission of said current packet, wherein said estimate of said end-to-end transmission delay is calculated based on said first approximation of the clock skew between the sender clock and the receiver clock, and (iii) a vector comprising said timestamp of the sender clock representative of said current packet being sent.

14. The method of claim 1 further comprising the step of comparing said estimate of the clock skew between the sender clock and the receiver clock with said first approximation of the clock skew between the sender clock and the receiver clock to determine whether said method of calculating said estimate of the clock skew has converged.

15. A method of adaptively adjusting a size of an input buffer associated with a receiving location in a packet-based communications network, one or more packets having been transmitted from a sending location in the communications network to the receiving location in the communications network, the method comprising the steps of:

calculating a first approximation of a clock skew between a sender clock and a receiver clock based on the transmission of one-or more of said packets, the sender clock associated with the sending location in the communications network and the receiver clock associated with the receiving location in the communications network;

evaluating the transmission of a current packet, said current packet having been transmitted subsequent to said transmission of said one or more of said packets, to measure a predetermined characteristic of said transmission of said current packet;

computing a covariance matrix associated with said current packet based on a timestamp of the sender clock representative of said current packet being sent and on a previous covariance matrix associated with a packet transmitted prior to said transmission of said current packet;

calculating an estimate of the clock skew between the sender clock and the receiver clock based on said first approximation thereof and on said measured characteristic of said transmission of said current packet;

comparing said estimate of the clock skew between the sender clock and the receiver clock with said first approximation of the clock skew between the sender clock and the receiver clock to determine whether the calculation of the estimate of the clock skew has converged; and adjusting the size of the input buffer associated with the receiving location in the communications network based on the estimate of the clock skew between the sender clock and the receiver clock when the calculation of the estimate of the clock skew has converged.

16. The method of claim 15 wherein said estimate of the clock skew between the sender clock and the receiver clock is calculated based on said covariance matrix associated with said current packet, and wherein said estimate of the clock skew between the sender clock and the receiver clock is calculated further based on a summation of said first approximation of the clock skew between the sender clock and the receiver clock and of a product of:

(i) an inverse of said covariance matrix,
(ii) an error signal comprising a difference between said measured characteristic comprising said end-to-end transmission delay and an estimate of said end-to-end transmission delay, wherein said estimate of said end-to-end transmission delay is calculated based on said first approximation of the clock skew between the sender clock and the receiver clock, and
(iii) a vector comprising said timestamp of the sender clock representative of said current packet being sent.

17. The method of claim 15 further comprising the step of:

calculating an estimate of a delay jitter associated with said transmission of said current packet, wherein said estimate of the clock skew between the sender clock and the receiver clock is calculated based on said covariance matrix associated with said current packet, and wherein said estimate of the clock skew between the sender clock and the receiver clock is calculated further based on a summation of said first approximation of the clock skew between the sender clock and the receiver clock and of a product of:

(i) an inverse of said covariance matrix,
(ii) an error signal comprising a difference between said measured characteristic comprising said end-to-end transmission delay and an estimate of said end-to-end transmission delay, said error signal being further calculated based on said estimate of said delay jitter associated with said transmission of said current packet, wherein said estimate of said end-to-end transmission delay is calculated based on said first approximation of the clock skew between the sender clock and the receiver clock, and
(iii) a vector comprising said timestamp of the sender clock representative of said current packet being sent.

18. An apparatus for calculating an estimate of a clock skew between a sender clock and a receiver clock in a packet-based communications network, the sender clock associated with a sending location in the communications network from which one or more packets have been transmitted to a receiving location in the communications network, the receiver clock associated with the receiving location in the communications network, the apparatus comprising:

means for calculating a first approximation of the clock skew between the sender clock and the receiver clock based on the transmission of one or more of said packets;

means for evaluating the transmission of a current packet, said current packet having been transmitted subsequent to said transmission of said one or more of said packets, to measure a predetermined characteristic of said transmission of said current packet;

means for computing a covariance matrix associated with said current packet based on a timestamp of the sender clock representative of said current packet being sent and on a previous covariance matrix associated with a packet transmitted prior to said transmission of said current packet; and means for calculating said estimate of the clock skew between the sender clock and the receiver clock based on said first approximation thereof and on said measured characteristic of said transmission of said current packet.

* * * * *